United States Patent [19]

Fujimoto et al.

[11] Patent Number: 4,982,799
[45] Date of Patent: Jan. 8, 1991

[54] TRACTOR EQUIPPED WITH WORKING IMPLEMENTS

[75] Inventors: Hiromu Fujimoto; Nobuhide Yanagawa; Eriya Harada, all of Osaka, Japan

[73] Assignee: Kubota Ltd., Osaka, Japan

[21] Appl. No.: 395,143

[22] Filed: Aug. 16, 1989

Related U.S. Application Data

[63] Continuation of Ser. No. 920,778, Oct. 20, 1986, abandoned.

[30] Foreign Application Priority Data

| Oct. 24, 1985 | [JP] | Japan | 60-238958 |
| Nov. 13, 1985 | [JP] | Japan | 60-254175 |
| Dec. 2, 1985 | [JP] | Japan | 60-271762 |

[51] Int. Cl.$^5$ .......................................... A01B 41/06
[52] U.S. Cl. ........................................ 172/2; 180/247; 180/338; 180/345; 180/900
[58] Field of Search ............... 172/2, 810; 180/70.1, 180/247, 233, 338, 345, 900; 105/73, 75

[56] References Cited

U.S. PATENT DOCUMENTS

| 1,090,132 | 3/1914 | Buchanan | 180/233 |
| 2,927,649 | 3/1960 | Poynor et al. | 172/2 |
| 2,964,863 | 12/1960 | Shepherd | 172/136 |
| 3,810,513 | 5/1974 | Spiller et al. | 172/439 |
| 4,043,422 | 6/1977 | Barrett et al. | 180/140 |
| 4,700,301 | 10/1987 | Dyke | 364/456 |

FOREIGN PATENT DOCUMENTS

| 0043803 | 8/1982 | European Pat. Off. . |
| 0071573 | 8/1983 | European Pat. Off. . |
| 1150292 | 5/1963 | Fed. Rep. of Germany . |
| 54163002 | 5/1978 | Japan . |
| 615655 | 2/1949 | United Kingdom . |
| 1278875 | 2/1972 | United Kingdom . |
| 2046683 | 6/1980 | United Kingdom . |
| 2135641 | 3/1984 | United Kingdom . |

*Primary Examiner*—Edward M. Coven
*Assistant Examiner*—Valerie A. Szczepanik
*Attorney, Agent, or Firm*—Birch, Stewart, Kolasch & Birch

[57] ABSTRACT

A two-axle four-wheel tractor is equipped at its front and rear ends with working implements, individually, which are of the same type, opposite in working direction and shiftable between a working position and a nonworking position. The tractor has a steering system for steering the front and rear four wheels in the same direction through the same angle, a running transmission system for driving only the wheels positioned toward one of the working implements which is lifted to the nonworking position or, in a special case, a system for restraining the wheels positioned rearward with respect to the direction of advance of the tractor in a straight running position without permitting steering.

1 Claim, 9 Drawing Sheets

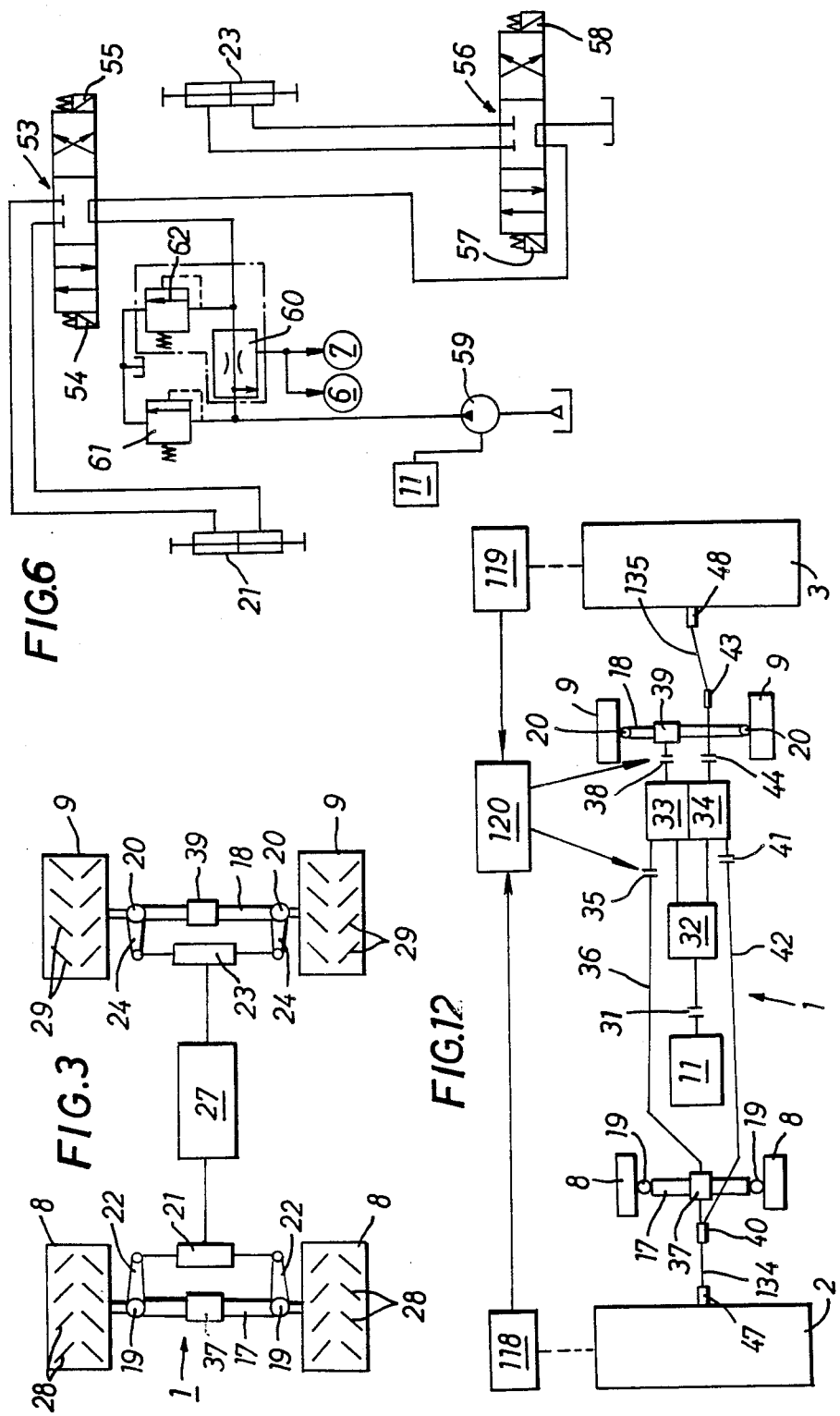

FIG.5

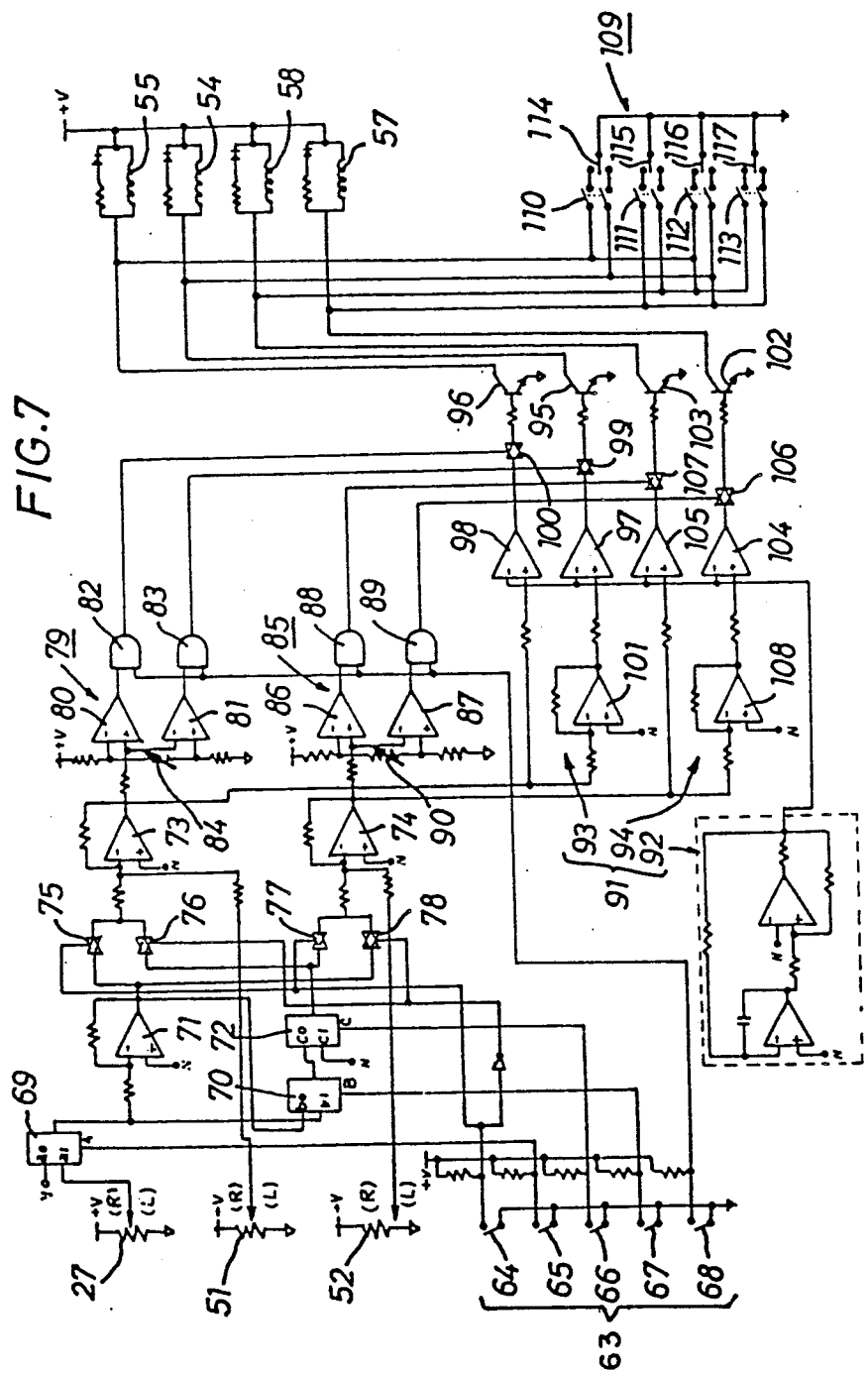

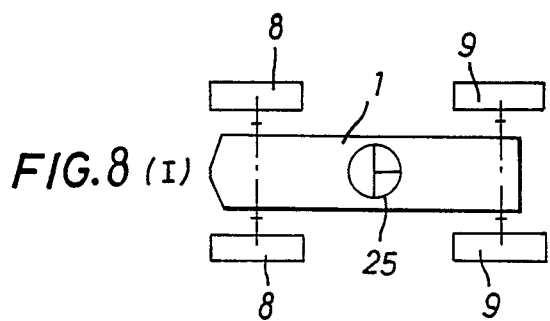
FIG.8 (I)
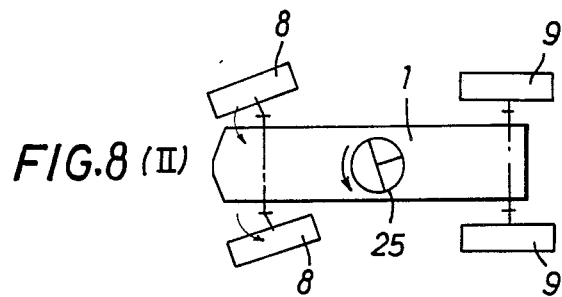
FIG.8 (II)
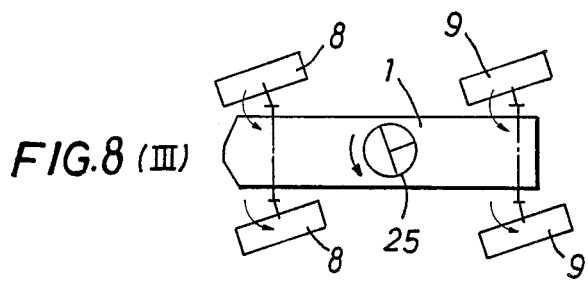
FIG.8 (III)
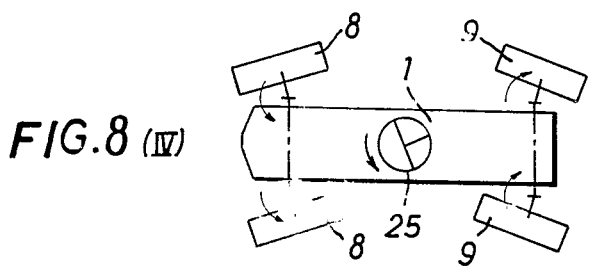
FIG.8 (IV)
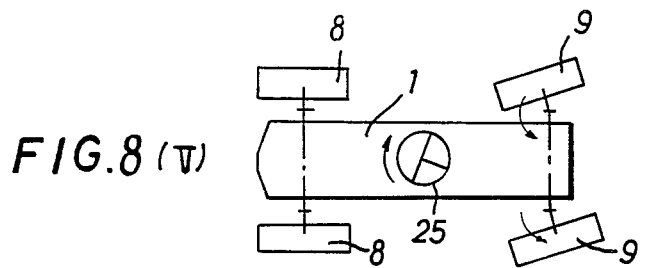
FIG.8 (V)

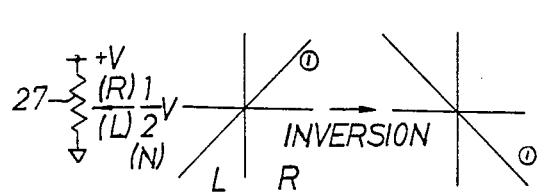
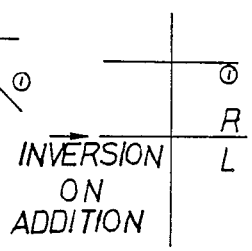
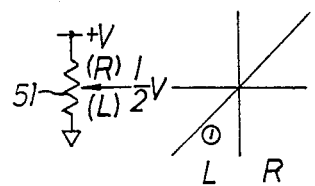
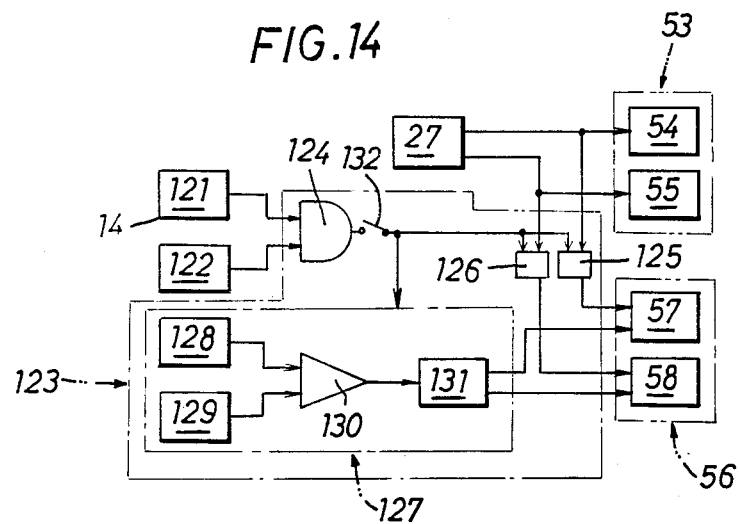

TRACTOR EQUIPPED WITH WORKING IMPLEMENTS

This application is a continuation of application Ser. No. 06/920,778 filed on Oct. 20, 1986, now abandoned.

FIELD OF THE INVENTION AND RELATED ART STATEMENT

The present invention relates to a tractor equipped with working implements for use in agricultural work, light civil engineering work, and the like, and more particularly to a two-axle four-wheel tractor equipped with working implements of the same type individually attached to the front and the rear of the tractor.

Tractors which are power-driven running vehicles are usually equipped with a liftable working implement attached to its front or rear end for use in various kinds of work such as cultivation, excavation or harvesting.

Unexamined Japanese Pat. Publication SHO No. 54-163002 discloses a tractor having liftable working implements attached to the front and rear ends of the tractor. The disclosed tractor is of the two-axle four-wheel type and is provided with a front loader in front of the tractor and a backhoe in the rear thereof.

When the direction of advance of such a conventional tractor is to be reversed for working at the end of a work site such as a field, the working direction is changed to the opposite direction by turning the tractor equipped with the implement or implements.

The conventional tractors therefore have the problem of leaving a large strip of unworked land, i.e. headland, at the ends of the work site to result in a low work efficiency.

OBJECTS AND SUMMARY OF THE INVENTION

A first object of the present invention is to assure an improved work efficiency without leaving a large area of headland at the work site.

A second object of the present invention is to provide a tractor equipped with working implements which is easily and smoothly movable from a worked area to an unworked area at the work site.

A third object of the present invention is to provide a tractor which is adapted to exert an increased force of traction.

A fourth object of the present invention is to provide a tractor equipped with front and rear working implements which is so adapted that the wheels positioned rearward with respect to the direction of advance of the tractor can be automatically held in position for advancing in a straightline when the two working implements are in a nonworking position with the operator seated in the tractor.

To fulfill the above objectives, the present invention provides a two-axle four-wheel tractor of the following construction.

The tractor is equipped, at each of its front and rear ends, with a working implement, and the two working implements are of the same type, opposite in working direction and shiftable between a working position and a nonworking position.

The tractor may be provided with steering means by which the front and rear four wheels can be steered in the same direction through the same angle.

The tractor may be provided with running transmission means by which only the wheels toward one of the working implements in the nonworking position can be driven.

The tractor may further be provided with implement detecting means for detecting that both the front and rear working implements are in the working position, operator detecting means for detecting that the operator is in his seat on the tractor, and control means for controlling a steering system so that when both the detecting means detect the above-mentioned states, the wheels positioned rearward with respect to the direction of advance of the tractor are confined in postion for advancing in a straight line without permitting steering.

BRIEF DESCRIPTION OF THE DRAWINGS

FIGS. 1 to 4 show a first embodiment of the present invention;

FIG. 1 is an overall side elevational view;

FIG. 2 is a plan view of the same;

FIG. 3 is a plan view schematically showing the steering system of the tractor;

FIG. 4 is a plan view schematically showing the transmission system of the tractor;

FIG. 5 is an overall plan view of another embodiment of the invention;

FIG. 6 is a hydraulic circuit diagram of the embodiment of FIG. 5;

FIG. 7 is an electric circuit diagram of the embodiment of FIG. 5;

FIG. 8 is a diagram illustrating steering modes of the embodiment of FIG. 5;

FIG. 10 is a diagram illustrating an operation for the embodiment of FIG. 5;

FIG. 12 is a plan view schematically showing the transmission system of still another embodiment of the invention;

FIG. 14 is a block diagram showing a control system of the embodiment of FIG. 13.

DESCRIPTION OF THE PREFERRED EMBODIMENTS

Embodiments of the present invention will be described below with reference to the drawings.

Figure 1:
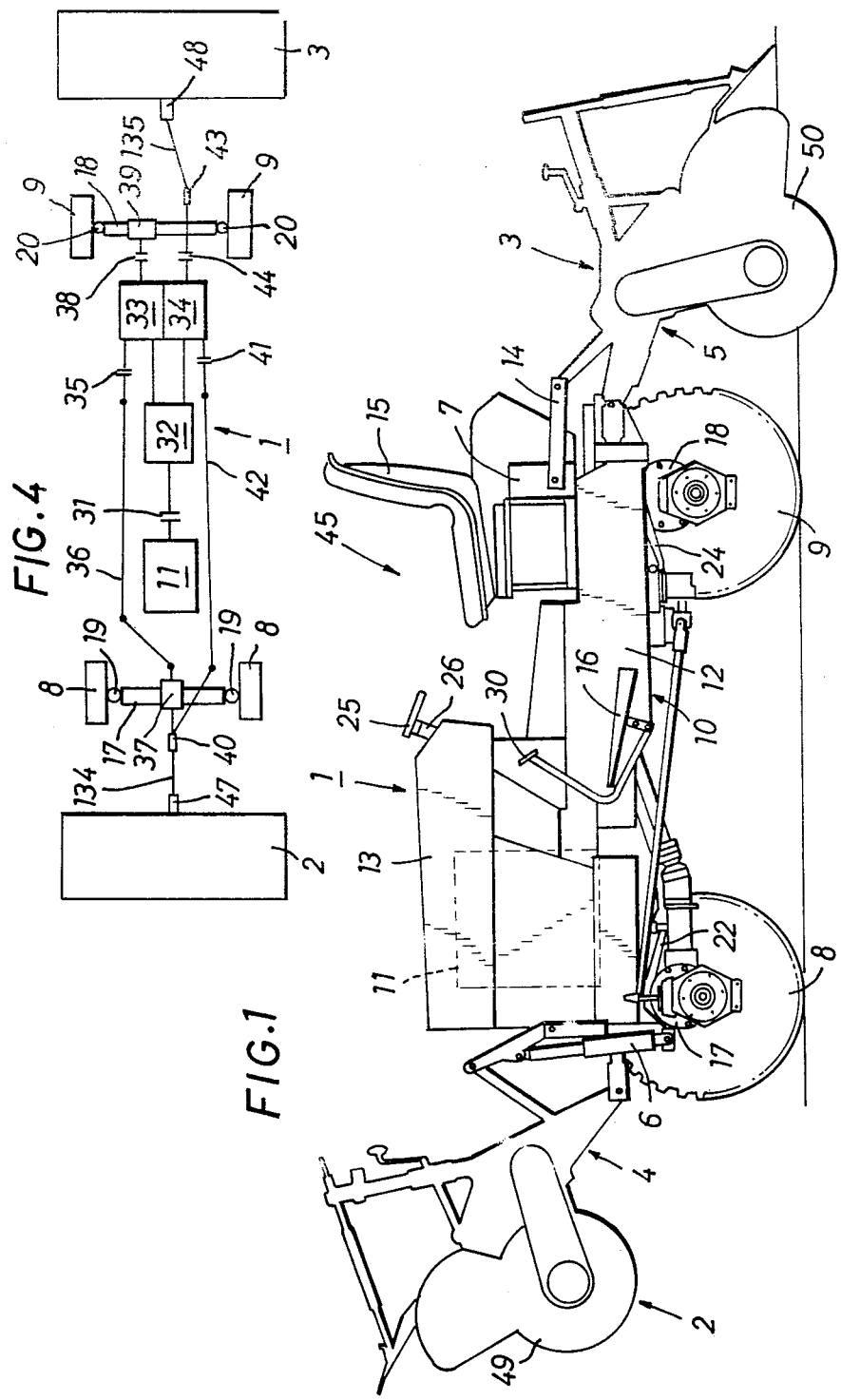
Figure 2:
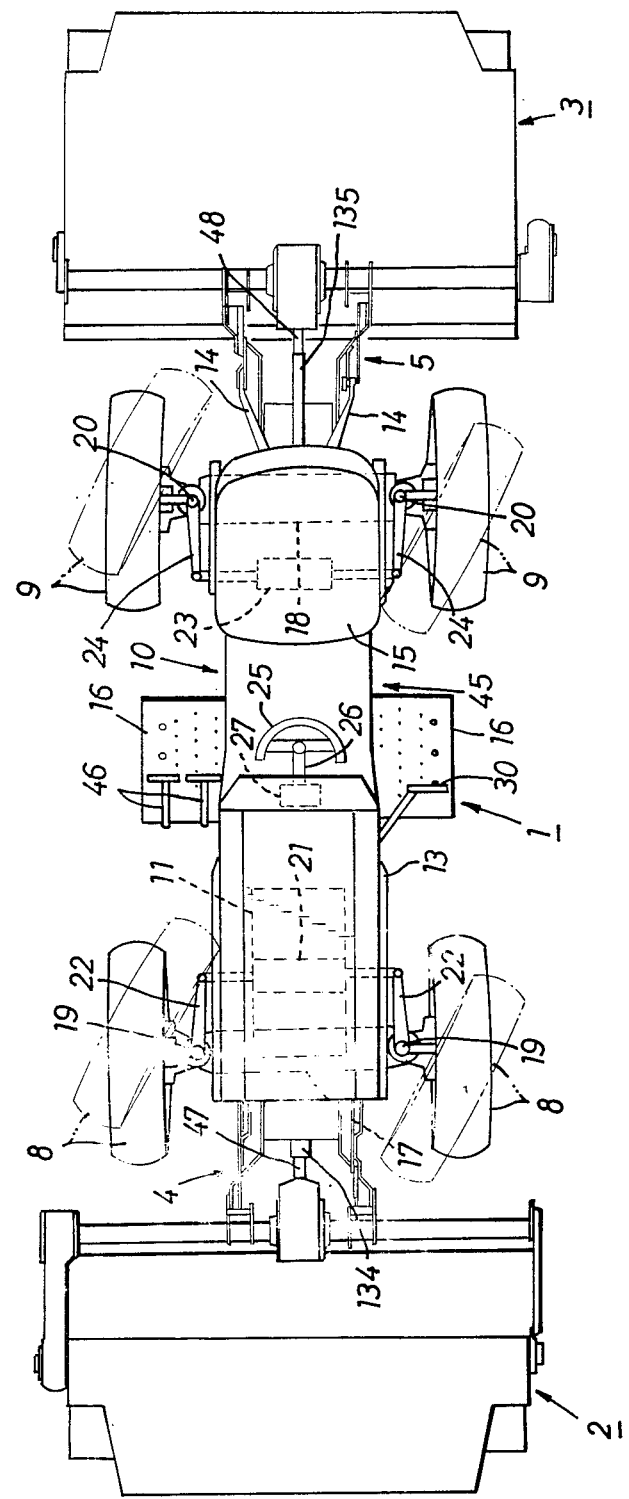

FIGS. 1 and 2 show a tractor 1 having front and rear rotary cultivators 2 and 3 shown as examples of working implements of the same type and removably attached to the front and rear ends of the tractor 1 by two-point link assemblies 4 and 5, respectively. The cultivators 2 and 3 are liftable by lift cylinders 6 and an implement lifting hydraulic unit 7, respectively, whereby the cultivators 2 and 3 can be brought to a working position in contact with the ground or to a nonworking position lifted off the ground.

The direction in which the work by the front rotary cultivator 2 progresses (working direction) is rearward with respect to the tractor 1, while the working direction of the rear cultivator 3 is forward with respect to the tractor 1.

The tractor 1 is of the two-axle four-wheel type and has a pair of opposite front wheels 8 and a pair of rear wheels 9.

The body 10 of the tractor 1 includes an engine 11, a transmission mechanism in case 12 positioned in the rear of the engine 11 and connected thereto, and the like. The engine 11 is covered with a bonnet 13.

The lift cylinders 6 are provided in pairs at opposite sides of the front end of the tractor body 10. The implement lifting hydraulic unit 7 is mounted on the transmission case 12 at the rear portion thereof and has a pair of opposed lift arms 14. A seat 15 is provided above the hydraulic unit 7. A pair of steps 16 extend from opposite sides of the case 12 at the front portion thereof.

As shown also in FIGS. 3 and 4, the front and rear portions of the tractor body 10 are respectively provided with a front axle case 17 and a rear axle case 18 therebelow. Each of the axle cases is positioned at the middle of the width of the body and is rotatable about a horizontal axis extending longitudinally of the body.

The front wheels 8 and the rear wheels 9 are supported by opposite ends of the front and rear axle cases 17 and 18, respectively, and are rotatable about kingpins 19 and 20.

The front wheels 8 are operatively connected together by a front wheel steering cylinder 21 and steering arms 22 each fixed to the upper end of the kinpin 19. The rear wheels 9 are coupled together by a rear wheel steering cylinder 23 and steering arms 24 each fixed to the upper end of the kingpin 20.

The steering cylinders 21, 23 are of the double acting type, have their cylinder tubes supported by the tractor body 10 and are connected to the steering arms 22, 24 at the outer ends of the piston rods thereof.

A steering wheel 25 is supported by a post 26 at the rear end of the bonnet 13 and is coupled to a steering wheel potentiometer 27. The potentiometer 27 serves as means for giving steering instructions, is mounted on a fixed member and produces a steering instuction signal in accordance with the amount of manipulation of the wheel 25. The front and rear wheels 8 and 9 can be steered independently of each other by the potentiometer 27 and steering manual switches. The front and rear wheels 8 and 9 can also be steered in parallel, i.e., in the same direction through the same angle.

With reference to FIG. 3, the tire of each of the front and rear wheels 8, 9 is formed on its outer periphery with pairs of treads 28 or 29 arranged circumferentially thereof, the treads of each pair being generally opposed to each other axially of the tire.

In the case of the front wheels 8, each tread 28 of each pair is inclined with respect to the axial direction so as to extend in one circumferential direction of the wheel 8 as the tread approaches the other tread 28 of the pair.

The above-mentioned one circumferential direction is the direction of rotation of the front wheel 8 when the tractor 1 travels rearward, i.e. in the working direction of the front rotary cultivator 2.

In the case of the rear wheels 9, each tread 29 each pair is inclined with respect to the axial direction so as to extend in one circumferential direction of the rear wheel 9 as the tread 29 approaches the other tread 29 of the pair.

The above-mentioned one circumferential direction is the direction of rotation of the rear wheel 9 when the tractor 1 advances forward, i.e. in the working direction of the rear rotary cultivator 3.

Thus, the pairs of treads 28 on the front wheels 8 are oriented in a direction opposite to that of the pairs of treads 29 on the rear wheels 9.

FIG. 4 schematically shows a running transmission system and a PTO transmission system for the tractor 1.

The transmission case 12 houses a main clutch 31 engageable and disengageable by a clutch pedal 30, a main speed change mechanism 32 connectable to the engine 11 by the main clutch 31, a running speed change mechanism 33 and a PTO speed change mechanism 34 which are connected in parallel with the main speed change mechanism 32. Each of the speed change mechanisms 32, 33 and 34 has incorporated therein forward-reverse change means for the forward and reverse travel of the tractor 1.

The running speed change mechanism 33 is operatively connected to the front wheels 8 by a front wheel clutch 35, a transmission shaft 36, a front wheel differential mechanism 37, and the like, and is operatively connected to the rear wheels 9 by a rear wheel clutch 38, a rear wheel differential mechanism 39, and the like.

The PTO speed change mechanism 34 is operatively connected to a front PTO shaft 40 projecting forward from the tractor body 10 by a front PTO clutch 41, and a transmission shaft 42.

The PTO speed change mechanism 34 is also coupled to a rear PTO shaft 43 projecting rearward from the tractor body 10 by a rear PTO clutch 44.

Members are provided between the steering wheel 25 and the seat 15 and therearound to provide a steering assembly 45, which includes speed change levers, hydraulic control levers, and a pair of brake pedals 46 for operating the wheels 9 independently of each other.

The cultivators 2, 3 have input shafts 47, 48 coupled to the PTO shafts 40, 43 by transmission shafts 134, 135, and rotary tiller units 49, 50, respectively.

The tractor 1 is provided with a control system which is operable by remote control, for example, wirelessly. The tractor 1 and the two cultivators 2, 3 can be operated also by this control system.

When the tractor 1 thus constructed is to be advanced for cultivating a field, the front cultivator 2 is lifted off the ground to the nonworking position by the lift cylinders 6 as seen in FIG. 1 and is held out of operation by disengaging the front PTO clutch 41.

Further the rear cultivator 3 is placed in contact with the ground in the working position as seen in FIG. 1, and the rear PTO clutch 44 is engaged to drive the tiller unit 50 of the cultivator 3.

In this state, the front wheel clutch 35 is manually engaged to drive the pair of front wheels 8 forward, while the rear wheel clutch 38 is manually disengaged to make the pair of rear wheels 9 serve as driven wheels. Thus, the tractor 1 is advanced to cause the cultivator 3 to till the soil.

Since the front cultivator 2 is lifted to the nonworking position in this case, the gravity on the front cultivator 2 acts on the drive front wheels 8, which therefore afford an increased force of traction. Further, because the gravity on the rear cultivator 3 is not delivered to the rear wheels 9 which are not driven, the increased traction can be obtained efficiently from a limited amount of engine power.

In the front wheels 8, the treads 28 in each pair are generally opposed to each other axially of the wheel 8 and are inclined with respect to the axial direction, such that each of the treads extends in a direction opposite to the direction of rotation of the front wheel as the tread 28 approaches the other tread 28. Consequently, the pairs of tread 28 revolve while holding the soil therebetween, enabling the front wheels 8 to exert increased traction, while the soil is readily releasable from the wheels 8 with a reduced amount of adhesion of soil thereto.

When the tractor 1 and the cultivators 2, 3 reach one end of the field area with the progress of cultivation, the tractor 1 with the cultivators 2, 3 needs to be moved from the worked area to the adjoining unworked area, and the working direction must be reversed.

At this time, the tractor 1 and the cultivators 2, 3 are transferred from a worked area to an unworked area generally by lifting the rear cultivator 3 to the nonworking position like the front cultivator 2 while holding the rear cultivator 3 out of operation, and then driving the front wheels 8 and/or the rear wheels 9 to advance the tractor rearward while manipulating the steering wheel 25.

Although the front wheels 8 only or the rear wheels 9 only may be steered by the steering wheel 25 in this case, the tractor 1 and the cultivators 2, 3 are easily movable from the worked area to the unworked area with a reduced likelihood of disturbing the cultivated area, by steering the front and rear wheels 8, 9 in parallel toward the unworked area through the same angle as shown in phantom lines in FIG. 2.

The tractor 1 may be moved as above while driving the front cultivator 2 in its working position on the ground to cultivate the soil.

After the tractor 1 has been moved to the unworked area along with the cultivators 2, 3, the tractor 1 and the cultivators 2, 3 are brought to the end of the field by advancing forward.

The front cultivator 2 is then lowered to the working position on the ground and driven. In this state, the soil is cultivated by the front cultivator 2 while advancing the tractor 1 rearward by driving the pair of rear wheels 9 only in the reverse direction, with the pair of front wheels 8 serving as driven wheels.

The rear wheels 9 afford an increased traction in this case also as already described.

The field is progressively cultivated from area to area by repeating the above procedure. Since the tractor 1 and both the cultivators 2, 3 are moved from the worked area to the unworked area with a change of the working direction at the ends of the field by moving the tractor 1 obliquely, rearward and forward and shifting the cultivators 2, 3 without turning the tractor 1 through 180 degrees, an improved work efficiency can be achieved without leaving a large uncultivated area, i.e. headland, at the ends of the field.

According to the present invention, the tractor 1 may be provided with a control system of the following construction for the steering means.

Figure 5:
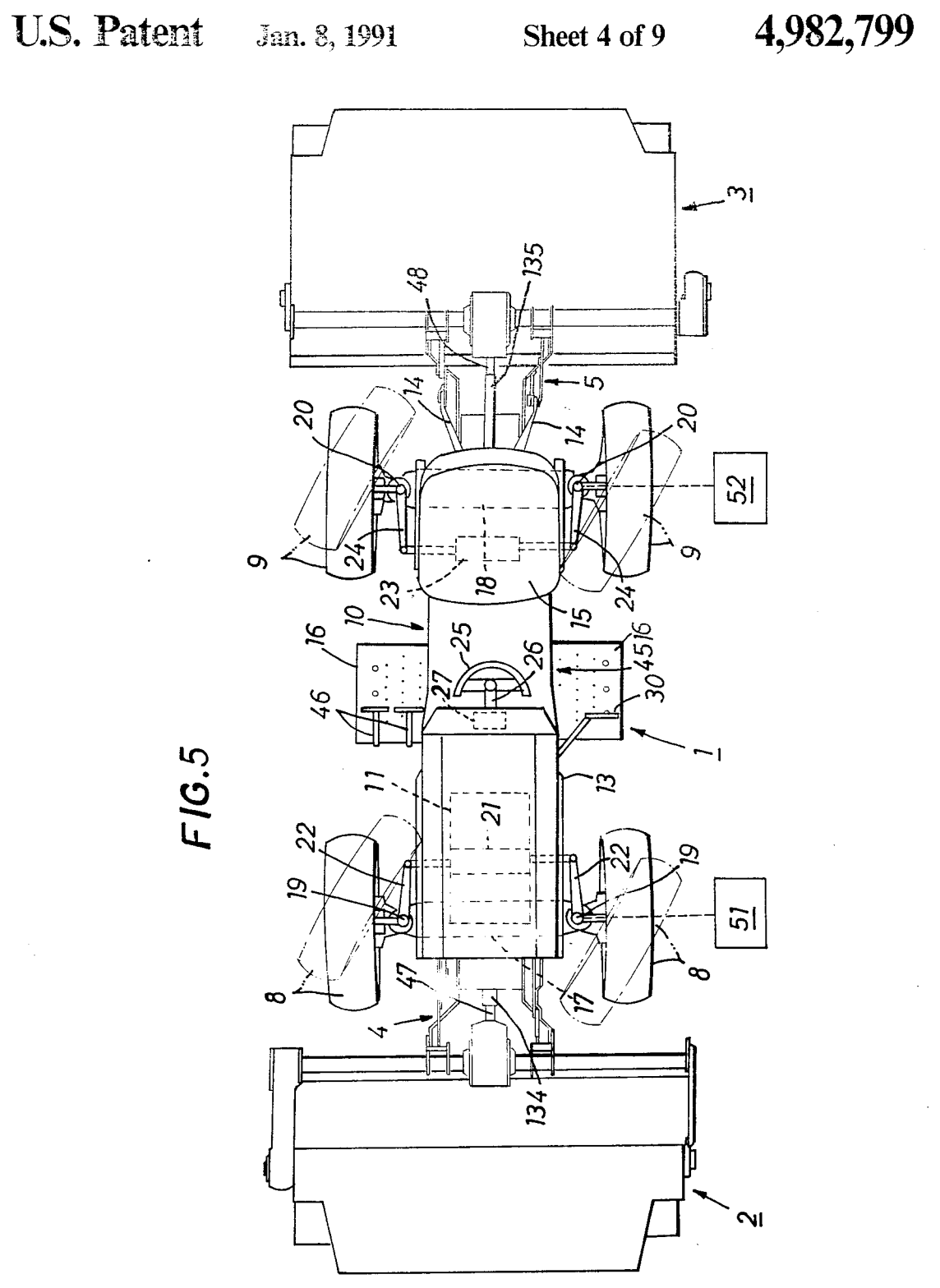

FIG. 5 shows a front wheel potentiometer 51 and a rear wheel potentiometer 52 serving as means for detecting the steering angle of the front wheels 8 or the rear wheels 9. These means 51 and 52 are mounted on the kingpins 19, 20, respectively, at the upper ends of the pin.

FIG. 6 shows a hydraulic circuit for the steering cylinders 21 and 23. A front wheel electromagnetic valve 53 of the switching type for controlling the front steering cylinder 21 has a left solenoid 54 for leftward steering and a right solenoid 55 for rightward steering. Like the valve 53, a rear wheel electromagnetic valve 56 of the switching type for controlling the rear wheel steering cylinder 23 has a left solenoid 57 and a right solenoid 58.

The engine 11 drives a hydraulic pump 59, from which pressure oil is supplied preferentially to the valves 53 and 56 at a constant flow rate via a preferential valve 60. The remaining oil is supplied to the lift cylinders 6 and the implement lifting hydraulic unit 7. The hydraulic circuit has relief valves 61 and 62.

FIG. 7 shows a control circuit for the electromagnetic valves 53 and 56. The circuit includes two systems, i.e. a front wheel control system and a rear wheel control system. Steering mode selecting means 63 has a forward-reverse change switch 64 for selecting forward travel or rearward travel, a steering-straight change switch 65 for selecting steering or straight travel, a two wheel-four wheel change switch 66 for selecting two-wheel steering or four-wheel steering, a parallel-nonparallel change switch 67 for selecting parallel steering or nonparallel steering and an automatic-manual change switch 68 for selecting automatic steering or manual steering.

A first multiplexer 69 produces an instruction signal from the steering wheel potentiometer 27 when steering (OFF) is selected by the change switch 65 or emits a reference signal ($\frac{1}{2}$ V) from an N terminal when straight, travel (OFF) is selected by the switch. A second multiplexer 70 delivers the signal from the first multiplexer 69 when parallel steering (OFF) is selected by the change switch 67 or a signal from an inverter 71 when nonparallel steering (ON) is selected. A third multiplexer 72 gives a reference signal ($\frac{1}{2}$ V) from an N terminal when two-wheel steering (OFF) is selected by the change switch 66 or delivers the signal from the second multiplexer 70 when four-wheel steering is selected. The first to third multiplexers 69, 70 and 72 are all for analog use.

The inverter 71 inverts the instruction signal or reference signal ($\frac{1}{2}$ V) from the first multiplexer 69 upon comparison with a reference signal ($\frac{1}{2}$ V) from an N terminal.

An adder-comparator 73 for the front wheels adds the signal from the inverter 71 or the third multiplexer 72 to a detection signal from the front wheel potentiometer 51 at its input side and compares the resulting addition signal with a reference signal from an N terminal to determine the deviation from the steering target for the front wheels 8.

An adder-comparator 74 for the rear wheels adds the signal from the inverter 71 or the third multiplexer 72 to a detection signal from the rear wheel potentiometer 52 at its input side and compares the resulting addition signal with a reference signal from an N terminal to determine the deviation from the rear wheel steering target.

The circuit further includes first to fourth analog switches 75 to 78. When forward travel is selected by the change switch 64, the first analog switch 75 feeds the signal of the inverter 71 to the adder-comparator 73, and the third analog switch 77 sends the signal of the third multiplexer 72 to the adder-comparator 74. When rearward travel is selected by the change switch 64, the second analog switch 76 sends the signal of the third multiplexer 72 to the adder-comparator 73, and the fourth analog switch 78 feeds the signal of the inverter 71 to the adder-comparator 74.

Direction discriminating means 79 for the front wheels includes comparators 80, 81 AND circuits 82, 83, and a variable resistor 84 for providing a dead zone between the comparators 80, 81. When the deviation signal from the adder-comparator 73 is greater than an upper reference value, the comparator 80 recognizes rightward steering, whereas if it is smaller than a lower reference value, the comparator 81 recognizes leftward steering. With automatic steering (OFF) selected by the change switch 68, the resulting signal is delivered from the AND circuit 82 or 83 concerned. Direction discriminating means 85 for the rear wheels comprises comparators 86, 87, AND circuits 88, 89, and a variable resistor 90 and recognizes the steering direction based on the deviation signal from the adder-comparator 74, like the discriminating means 79.

Drive means 91 includes a triangular wave signal generator 92, a front wheel driver 93 and a rear wheel driver 94. The front wheel driver 93 for driving the solenoids 54 and 55 of the front wheel electromagnetic valve 53 includes switching elements 95, 96, comparators 97, 98, analog switches 99, 100 and an inverter 101. The comparator 98 compares a triangular wave signal from the generator 92 with the deviation signal from the adder-comparator 73 and delivers an output signal when the triangular wave signal is smaller than the deviation signal to drive the switching element 96 via the analog switch 100. Since the deviation signal gradually varies during steering, the switching element 96 is repeatedly turned on and off with a pulse width in accordance with the variation, passing an energizing current of given value through the right solenoid 55. The analog switch 100 feeds the signal from the comparator 98 to the switching element 96 when there is a rightward steering signal from the AND circuit 82. The inverter 101 inverts the deviation signal from the adder-comparator 73 upon comparison with a reference signal from an N terminal. The comparator 97, the analog switch 99 and the switching element 95 function in the same manner as the comparator 98, the analog switch 100 and the switching element 96.

The rear wheel driver 94 is adapted to drive the solenoids 57, 58 of the rear wheel electromagnetic valve 56. Like the front wheel driver 93, the driver 94 includes switching elements 102, 103, comparators 104, 105, analog switches 106, 107 and an inverter 108.

Manual control means 109 includes a front wheel steering switch 110, a parallel steering switch 111, a nonparallel steering switch 112, a rear wheel steering switch 113, and right-left change switches 114 to 117 connected in series with these switches respectively.

A resistor and a diode are connected in parallel with each of the solenoids 54, 55, 57 and 58 so that a current will flow therethrough owing to a counter electromotive force produced when the corresponding one of the switching elements 95, 96, 102 and 103 is turned off.

Figure 9:
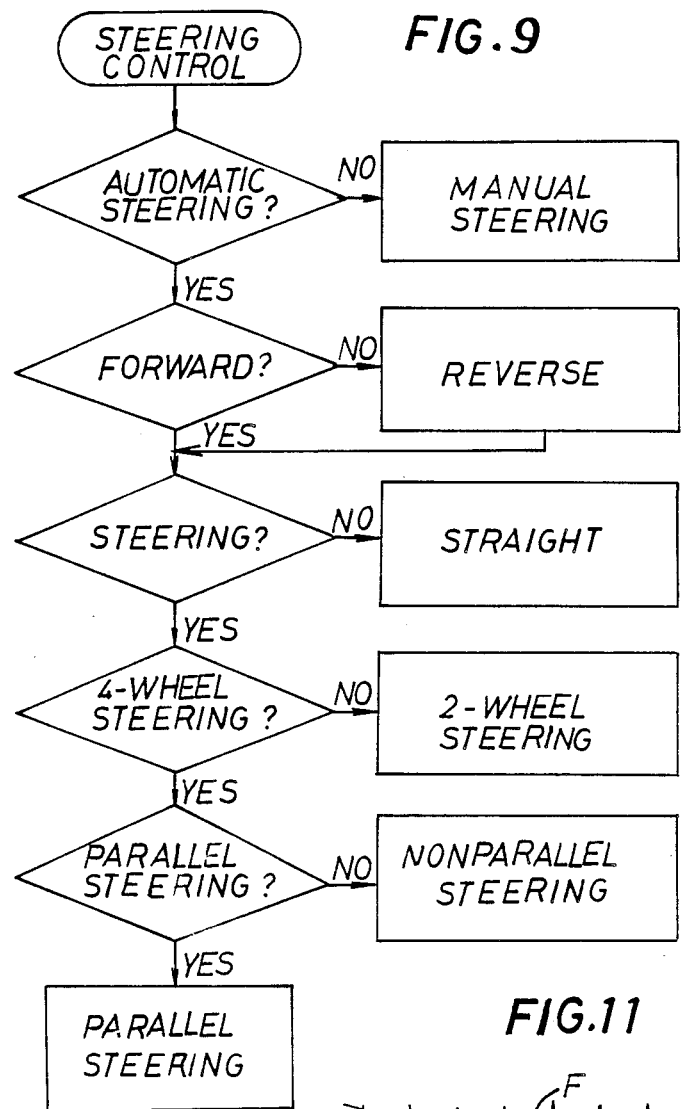
FIG. 9 is a flow chart showing how the steering modes are selected of the embodiment of FIG. 5.

The operation of the circuit described above will be described next. FIG. 8 shows the steering modes available, i.e., straight mode I, front two-wheel steering mode II, parallel steering mode III, nonparallel steering mode IV and rear two-wheel steering mode V. In the straight mode I, both the front and rear wheels run straight. In front two-wheel steering mode II, the front wheels 8 only are steered rightward or leftward. In the parallel steering mode III, the front and rear wheels 8, 9 both can be steered in the same direction through the same angle to run the vehicle obliquely forward. In the nonparallel steering mode IV, the front and rear wheels 8, 9 are steered through the same angle in directions opposite to each other. In the rear two-wheel steering mode V, the rear wheels 9 only are steered rightward or leftward. These modes are selectable by the operation of the change switches 64 to 68 of the steering mode selecting means 63 through the procedure shown in FIG. 9.

Before steering, the desired steering mode is selected by the change switches 64 to 68 of the mode selecting means 63, and the steering wheel 25 is then moved in the desired direction.

Suppose the steering wheel 25 is turned rightward when the front wheels 8 are directed leftward in the front two-wheel steering mode II during forward travel. Since the front wheels 8 are directed leftward, the front wheel potentiometer 51 detecting the steering angle is producing a detection signal which is smaller than ½ V as indicated at (1) in FIG. 10, A. The wheel 25 is now turned rightward through the desired angle, whereupon the steering wheel potentiometer 27 functions to produce an instruction signal greater than ½ V as indicated at (1) in FIG. 10, B. The instruction signal is fed through the first multiplexer 69 to the inverter 71, by which the signal is compared with the reference signal (½ V) from its N terminal, inverted as indicated at (1) in FIG. 10, C and then sent to the adder-comparator 73 via the first analog switch 75. At the input side of the adder-comparator 73, the detection signal representing the current steering angle of the front wheels 8 is added to the inverted instruction signal. The addition signal is compared by the comparator 73 with the reference signal from its N terminal and inverted as shown in FIG. 10, D. Consequently, a signal is produced which represents a deviation from the steering target. The deviation signal is fed to the direction discriminating means 79, and the direction is recognized by the comparators 80 and 81. Since the steering wheel 25 is turned rightward in this case, the comparator 80 emits a signal, which is then sent to the right-side analog switch 100 of the drive means 91 via the AND circuit 82.

Figure 11:
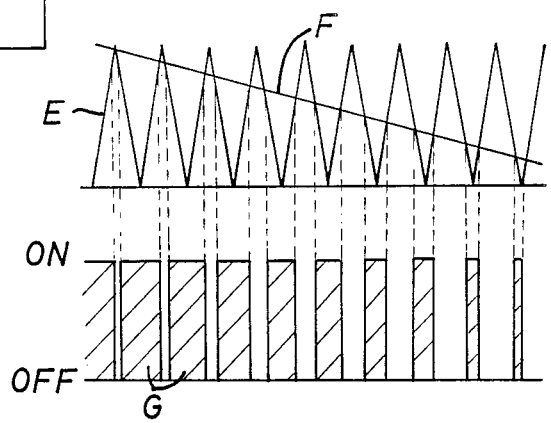
FIG. 11 is a diagram showing signal waveforms of the electric circuit of FIG. 7.

On the other hand, the triangular wave generator 92 produces a triangular wave signal E as shown in FIG. 11 and feeds the signal to the comparator 98, which has received the deviation signal F from the adder-comparator 73. These signals are compared in the comparator 98, with the result that the comparator 98 delivers a signal when the triangular wave signal is smaller than the deviation signal. The signal turns on the switching element 96 via the analog switch 100, energizing the right solenoid 55 and switching the front wheel electromagnetic valve 53 rightward. Consequently, the front wheel steering cylinder 21 functions, starting to steer the front wheels 8 rightward. With the steering movement of the front wheels 8, the detection signal of the front wheel potentiometer 51 gradually increases, so that the deviation signal F from the adder-comparator 73 gradually diminishes with the steering action as seen in FIG. 11. The width of the signal produced on comparison of the deviation signal F and the triangular wave signal E at the comparator 98 therefore gradually decreases. Thus, the period during which the switching element 96 is held on by pulse-width modulation, i.e. the pulse width of the current energizing the right solenoid 55, gradually decreases as indicated at G in FIG. 11. In other words, when the difference between the instruction signal from the steering wheel potentiometer 27 and the detection signal from the front wheel potentiometer 51 is greater, the deviation signal is greater, the pulse width is larger, the duration of flow of the energizing current through the right solenoid is greater, the degree of opening of the front wheel electromagnetic valve 53 is greater and the front wheel steering cylinder 21 operates more rapidly to steer the front wheels 8 at a higher rate. As the front wheels 8 approach the target, the pulse width decreases, the duration of flow of the current through the right solenoid 55 decreases, the opening degree of the valve 53 diminishes and the front wheel steering cylinder 21 operates less rapidly. The steering movement of the front wheels 8 discontinues upon the front wheels 8 reaching the target position. Accordingly, the impact that would otherwise occur when the steering movement is discontinued can be obviated, and the wheels can be steered through the desired angle rapidly and smoothly without overrunning. During the steering operation, current continues flowing owing to the counter electromotive force of the right solenoid 55 even while the switching element 96 is off. Thus, current flows through the right solenoid 55 at all times, and is therefore advantageous from the viewpoint of power consumption.

In parallel steering mode III, the front wheel system operates in the same manner as described above. In addition, an instruction signal from the steering wheel potentiometer 27 is sent to the adder-comparator 74 via the first to third multiplexers 69, 70 and 72 without passing through the inverter 71, while a detection signal delivered from the rear wheel potentiometer 52 and representing the steering angle of the rear wheels 9 is fed to the adder-comparator 74. The adder-comparator 74, the direction discriminating means 85 and the drive means 91 operate similarly, causing the rear wheel steering cylinder 23 to steer the rear wheels 9 in the same direction as the front wheels 8.

In the rear wheel system while the vehicle is in nonparallel steering move IV, and instruction signal inverted at the inverter 71 is sent to the adder-comparator 74 by way of the second and third multiplexers 70 and 72, so that unlike the operation in parallel steering mode III, the rear wheel steering cylinder 23 functions to steer the rear wheels 9 leftward, with the front wheels 8 steered rightward.

In straight running mode I, the instruction signal from the steering wheel potentiometer 27 is blocked by the first multiplexer 69, while a neutral reference signal is fed thereto from the N terminal, so that the parts function to direct the front and rear wheels 8 and 9 in a straight direction.

For example when the automatic control system malfunctions, the electromagnetic valves 53 and 56 can be changed over for desired steering by manipulating the switches of the manual control means 109.

Although the valves 53 and 56 used in the foregoing embodiment are of the simple switching type, electromagnetic valves of the proportional operation type may be driven by the deviation signals from the adder-comparators 73 and 74.

While the control system of the foregoing embodiment is of the analog type, a digital control system is similarly usable.

The steering mode may be limited only to one of front two-wheel steering mode II, parallel steering mode III, nonparallel steering mode IV and rear two-wheel steering mode V. While the mode is changeable according to the above embodiment, the invention is not limited to the mode-changeable system.

Most simply, the steering instruction or steering angle detecting means can be the potentiometers 27, 51 and 52, but other means are usable insofar as they convert a mechanical motion to an electric signal.

Further when the front wheels 8 or the rear wheels 9 only are to be steered, the instruction signal may be simply compared with the detection signal to determine the deviation.

The potentiometer 27 ned not always be coupled to the steering wheel 25 but may be manipulated directly by the operator.

According to the present invention, the front and rear wheel clutches 35 and 38 may be controlled in the following manner.

FIG. 12 shows front and rear detecting means 118, 119 for detecting that the front and rear cultivators 2, 3 are brought to the nonworking position, respectively, from the movement of the two-point link assemblies 4, 5, lift cylinders 6, hydraulic unit 7 or cultivators 2, 3.

Control means 120 for the front and rear wheel clutches 35, 38 receives a signal from the detecting means 118 or 119 to control the front or rear wheel clutch 35 or 38. The control means 120 engages the front wheel clutch 35 when receiving a detection signal from the front detecting means 118 or engages the rear wheel clutch 38 in response to a detection signal from the rear detecting means 119 to drive only the wheels 8 or 9 closer to the cultivator 2 or 3 in the nonworking position.

The front and rear wheel clutches 35 and 38 are engageable and disenagageable also manually.

The above arrangement is convenient in that it eliminates the need to manually select front-wheel drive or rear-wheel drive during working.

Further according to the present invention, the rear wheel steering system may be controlled in the following manner.

Figure 13:
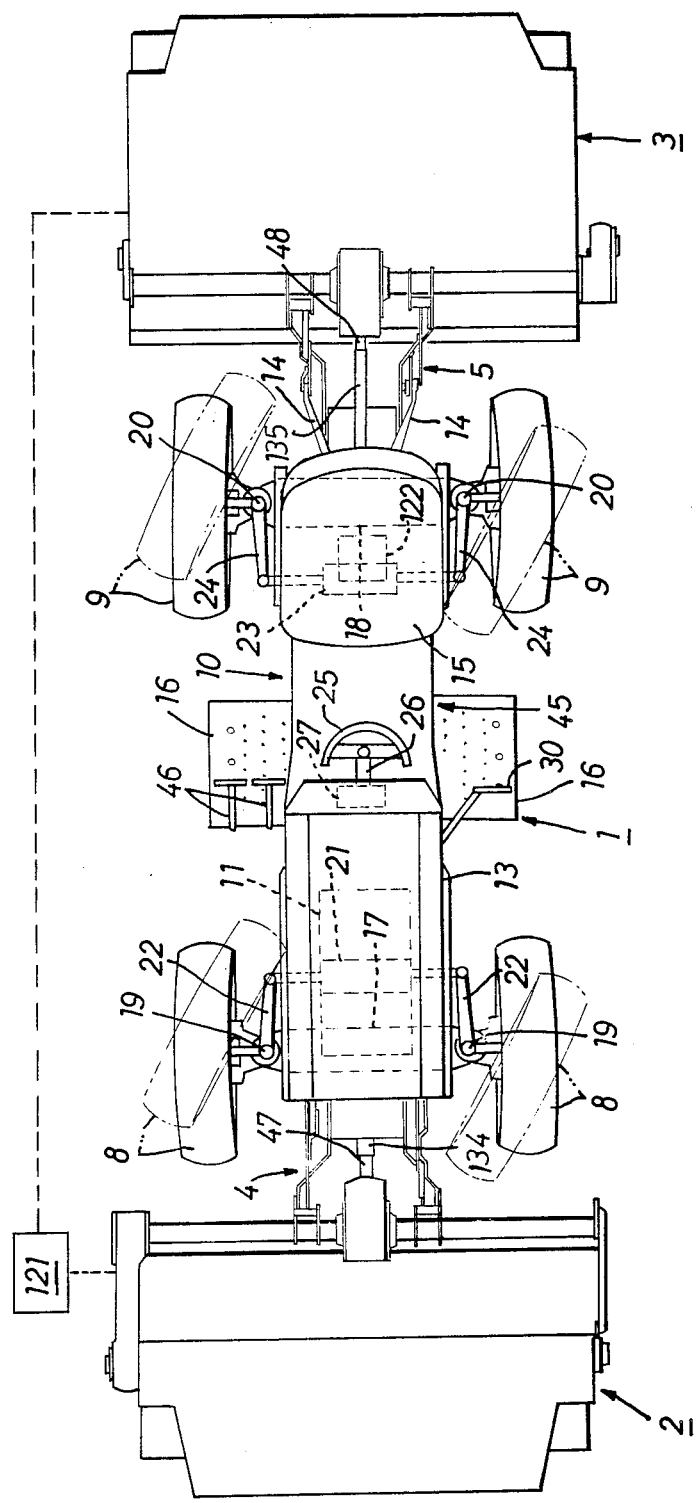
FIG. 13 is an overall plan view of a fourth embodiment of the invention.

FIG. 13 shows cultivator detecting means 121 for detecting the front and rear cultivators 2, 3 in the nonworking position and operator detecting means 122 for detecting whether or not the operator is seated in position.

The cultivator detecting means 121 detects the cultivators, specifically, the movement of the two-point link assemblies 4, 5, lift cylinders 6, hydraulic unit 7 or the cultivators 2, 3.

The operator detecting means 122 is incorporated, for example, in the seat 15 and actuated by the body weight of the operator.

FIG. 14 shows a control system for the steering system. Control means 123 comprises a gate circuit 124, unrestraining switch 132, switching elements 125, 126 and means 127 for restraining the rear wheels for straight travel.

The gate circuit 126 produces a rear wheel restraining signal in response to detection signals from both of the detecting means 121, 122.

The unrestraining switch 132 for blocking the restraining signal from the gate circuit 12 is usually on.

The switching elements 125, 126 are interposed between the steering wheel potentiometer 27 and the left and right solenoids 57, 58 of the rear wheel electromagnetic valve 56 for blocking the signal from the meter 27 in the presence of the restraining signal.

The rear wheel restraining means 127 comprises steering detecting means 128 for producing a signal in accordance with the direction of deviation and steering angle when the rear wheels 9 are to the side a straight course, a rear wheel position generating means 129 for producing a predetermined neutral signal, comparator means 130 for comparing the signals from the detecting means 128 and the generating means 129, and orientation discriminating means 131 for judging the direction of return of the rear wheels 9 to the straight course from the resulting value of comparison by the comparator means 130 to drive the solenoid 57 or 58. The restraining means 127 functions in response to the restraining signal.

When the tractor 1 and the cultivators 2, 3 reach the end of a field during cultivation, the front and rear wheels 8, 9 are steered in parallel to obliquely move the tractor 1 from a worked area to an unworked area along with the cultivators 2, 3. In this case, the cultivator 2 or 3 positioned rearward with respect to the direction of advance is driven in the working position during movement.

When the front and rear wheels 8, 9 are steered in parallel with both the cultivators 2, 3 in the nonworking position for the above movement, the unrestraining switch 132 is turned off as a special case before the steering.

For running on a road, the tractor 1 is driven while the front wheels 8 are being steered with the steering wheel 25 by the operator seated in the seat 15, and with the cultivators 2, 3 in the nonworking position. In this case, the rear wheels 9 are locked in position for straight running.

Stated more specifically, the operator detecting means 122 detects the operator when he is seated in the seat 15 before running on the road, and when the cultivators 2, 3 are raised to the nonworking position, the cultivator detecting means 121 detects the cultivators.

The unrestraining switch 132 is usually on, so that in response to detection signals from the detecting means 121, 122, the gate circuit 124 turns off the switching elements 125, 126 to block the signal from the steering wheel potentiometer 27, further actuating the rear wheel restraining means 127.

Now, suppose the rear wheels 9 are rightward of the straight running position shown in solid lines in FIG. 13, as indicated in phantom lines in FIG. 13. The steering detecting means 128 produces a detection signal in accordance with the direction of deviation and the steering angle and feeds the signal to the comparator means 130.

The comparator means 130 compares the detection signal with a predetermined neutral signal received from the straight position generating means 129. The result of the comparison is forwarded to the direction discriminating means 131.

The discriminating means 131 recognizes from the comparison value the direction of return of the rear wheels 9 toward the straight running position and energizes one of the left and right solenoids 57, 58 of the rear wheel electromagnetic valve 56. Thus, the rear wheels 9 are returned to the neutral straight running position by the operation of the valve 56 and the rear wheel steering cylinder 23.

In the above case wherein the rear wheels 9 are rightward of the straight running position as indicated in the phantom lines in FIG. 13, the direction discriminating means 131 energizes the left solenoid 57 of the valve 56, whereby the rear wheels 9 are steered leftward and returned to the neutral straight running position.

Upon return of the rear wheels 9 to the neutral position, the steering detecting signal 128 emits a straight running signal, causing the comparator means 130 to produce a comparison value of zero and bringing the rear wheel valve 56 to its neutral position to lock the rear wheel steering cylinder 23.

Accordingly, the tractor 1 can be driven while steering the front wheels 8 only in the usual manner.

Although the control system for the rear wheels only is controlled as described above, the control system for the front wheels, or for both the front and rear wheels may be similarly controlled.

While rotary cultivators are used as the working implements according to the embodiments described, the implements may be plows, trenchers or other means.

What is claimed is:

1. A tractor with working implements, which comprises
   (a) a tractor body including only one single engine and only one single transmission mechanism mounted in the rear of said engine;
   (b) front and rear wheels mounted in the front and rear of said tractor body;
   (c) a front linkage assembly and a rear linkage assembly each mounted to pivotally lift up and down at the front and rear ends of the tractor body, respectively;
   (d) front and rear cylinder units for actuating said front and rear linkage assemblies upward and downward;
   (e) front and rear working implements of the same type being connected with said front and rear linkage assemblies for working said front and rear working implements in opposite directions from each other;
   (f) switching means, included in said transmission mechanism, for switching a turning direction of power from said engine, and front and rear wheel transmission means for transmitting the engine power to the front and rear wheels from said switching means;
   (g) front wheel clutching means, housed in said front wheel transmission means, for clutching the power to said front wheels, and rear wheel clutching means, housed in said rear wheel transmission means, for clutching the power to said rear wheels;
   (h) front and rear detection means for monitoring, respectively, the front and rear implements in a working or nonworking position,
   (i) means for controlling said front and rear wheel clutching means, in response to signals from said front and rear detection means, to cut the power transmission to said front wheels and transmit power only to the rear wheels when the front implement is in a working position and the rear implement is in a non-working position and to cut the power transmission to said rear wheels and transmit power only to said front wheels when said rear implement is in a working position and said front implement is in a non-working position,
   (j) steering means for steering said front and rear wheels, and
   (k) means for controlling said front and rear cylinder units to raise said rear implement off the ground in a non-working position when said front implement is lowered to be in contact with the ground in a working position, and controlling said front and rear cylinder units to raise said front implement off the ground in a non-working position when said rear implement is lowered to be in contact with the ground in a working position.

* * * * *